(12) United States Patent
Zinser et al.

(10) Patent No.: US 8,199,681 B2
(45) Date of Patent: Jun. 12, 2012

(54) SOFTWARE RADIO FREQUENCY CANCELLER

(75) Inventors: Richard Louis Zinser, Niskayuna, NY (US); Michael James Hartman, Clifton Park, NY (US); John Erik Hershey, Balston Lake, NY (US); John Anderson Fergus Ross, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 12/334,019

(22) Filed: Dec. 12, 2008

(65) Prior Publication Data
US 2010/0150032 A1 Jun. 17, 2010

(51) Int. Cl.
*H04B 7/00* (2006.01)
(52) U.S. Cl. ......... 370/278; 455/130; 455/296; 455/307
(58) Field of Classification Search .......... 370/276–278; 455/130, 296, 307
See application file for complete search history.

(56) References Cited

U.S. PATENT DOCUMENTS

| | | | |
|---|---|---|---|
| 4,212,013 A | 7/1980 | Biethan et al. | |
| 4,520,476 A | 5/1985 | Searl | |
| 4,649,505 A | 3/1987 | Zinser, Jr. et al. | |
| 4,685,099 A | 8/1987 | White et al. | |
| 5,568,558 A * | 10/1996 | Ramm et al. | 381/94.4 |
| 5,630,223 A | 5/1997 | Bahu et al. | |
| 5,687,169 A | 11/1997 | Fullerton | |
| 5,691,978 A | 11/1997 | Kenworthy | |
| 6,035,312 A * | 3/2000 | Hasegawa | 708/322 |
| 6,337,884 B1 | 1/2002 | Cao et al. | |
| 6,370,245 B1 | 4/2002 | White | |
| 6,377,640 B2 | 4/2002 | Trans | |
| 6,442,170 B1 | 8/2002 | Perlman et al. | |
| 6,625,206 B1 | 9/2003 | Doblar | |
| 6,689,064 B2 * | 2/2004 | Hager et al. | 600/454 |
| 6,778,779 B1 | 8/2004 | Shay et al. | |
| 7,082,157 B2 | 7/2006 | Lin et al. | |
| 7,096,042 B2 | 8/2006 | Marinier | |
| 7,187,907 B2 | 3/2007 | Widrow | |
| 7,250,830 B2 | 7/2007 | Layne et al. | |
| 7,269,211 B2 | 9/2007 | Lin et al. | |
| 7,324,467 B2 | 1/2008 | Fleischhacker | |
| 7,346,134 B2 | 3/2008 | Smith | |
| 7,349,678 B2 | 3/2008 | Salfelner | |
| RE40,258 E | 4/2008 | Schloemer | |
| 7,366,480 B2 | 4/2008 | Amano | |
| 7,373,115 B2 | 5/2008 | Monroe | |
| 2004/0151238 A1 * | 8/2004 | Masenten | 375/219 |
| 2006/0140392 A1 * | 6/2006 | Ahmadi | 379/406.1 |

(Continued)

OTHER PUBLICATIONS

Chen S., Beach M.A., and McGeehan J.P.; "Division-free duplex for wireless applications", Electronic Letters; vol. 34, No. 2, Jan. 1998.

*Primary Examiner* — Hassan Kizou
*Assistant Examiner* — Siming Liu
(74) *Attorney, Agent, or Firm* — Fletcher Yoder

(57) ABSTRACT

A full-duplex RF communication system and corresponding methods use digital adaptive filters for interference cancellation. As provided, the techniques allow full-duplex radio frequency communication without frequency-, time-, or code-division multiplexing and without the use of hardware RF cancellers. Such techniques may be useful for wireless communication, such a cellular communication, radio communication, broadcasting, short-range point-to-point communication, wireless sensor networks, and wireless computer networks.

23 Claims, 4 Drawing Sheets

U.S. PATENT DOCUMENTS

| | | |
|---|---|---|
| 2007/0177679 A1 | 8/2007 | Sovenyi |
| 2008/0107046 A1 | 5/2008 | Kangasmaa et al. |
| 2008/0144665 A1 | 6/2008 | Ross et al. |
| 2008/0144666 A1 | 6/2008 | Ross et al. |
| 2008/0154957 A1* | 6/2008 | Taylor et al. ............... 707/104.1 |
| 2009/0286487 A1* | 11/2009 | Rofougaran et al. ........... 455/73 |
| 2010/0135482 A1* | 6/2010 | Jagannathan et al. ... 379/406.06 |

* cited by examiner

SOFTWARE RADIO FREQUENCY CANCELLER

BACKGROUND

The invention relates generally to radio frequency (RF) interference cancellation.

A two-way RF communication system is one in which signals are transmitted bi-directionally between transceivers. Each transceiver may include a transmitter to transmit signals and a receiver to receive incoming transmissions. To avoid interference between the transmitted signal and the received signal, the communication system may receive and transmit signals at different times in what is called half-duplex communication. However, half-duplex techniques do not allow efficient two-way communication because transmitting time is lost while signals are being received.

Full-duplex techniques allow signals to be transmitted and received simultaneously, providing increased bandwidth relative to half-duplex techniques. To avoid interference between the transmitted and received signals, full-duplex techniques may employ various strategies to separate these signals from one another. For example, full-duplex communication may employ time-division multiplexing (TDM), frequency-division multiplexing (FDM), or code-division multiplexing (CDM). In TDM, the transmitted and received signals may be transferred in different timeslots, but at a fast enough rate that the transferring appears to be simultaneous. In FDM, the transmitted and received signals may be separated enough in frequency that their modulated spectra do not overlap, and each receiver may be tuned such that it will receive the intended frequency and reject its own transmitted signal. In CDM, the signals may carry certain codes that allow certain signals to be separated from other signals.

In addition to signal division techniques, duplex communication architectures may employ hardware RF cancellers. Often, the hardware RF canceller may not provide adequate canceling, and these systems may also use an additional canceller at baseband. Accordingly, such hardware-based canceling systems may be complex and may involve multiple cancellation filters.

BRIEF DESCRIPTION

Provided herein is a method that includes receiving an analog primary signal from a receiver front end, an antenna, or a receiver input port; receiving an analog reference signal from a transmitter converting the analog primary signal into a digital primary signal; converting the analog reference signal into a digital reference signal; processing the digital reference signal with a digital adaptive filter, wherein the digital adaptive filter uses the digital reference and primary signals as inputs for determining filter weights of the digital adaptive filter to provide an output; and subtracting the output of the digital adaptive filter from the digital primary signal to generate a digital cancelled signal.

Also provided herein is a device programmed with machine-readable instructions for receiving an analog primary signal from a receiver front end, an antenna, or a receiver input port; receiving an analog reference signal from a transmitter; converting the analog reference signal into a digital reference signal; processing the digital reference signal with an digital adaptive filter, wherein the digital adaptive filter uses the digital reference and primary signals as inputs for determining filter weights of the digital adaptive filter to provide an output; and subtracting the output of the digital adaptive filter from the digital primary signal to generate a digital cancelled signal.

Also provided herein is a full-duplex wireless communication system that includes a receiver front end, an antenna, or a receiver input port capable of receiving an analog primary signal; a transmitter capable of transmitting an analog transmitted signal; a directional coupler capable of sampling a portion of the analog transmitted signal to provide an analog reference signal; a first analog to digital converter capable of converting the analog primary signal into a digital primary signal; a second analog to digital converter capable of converting the analog reference signal into a digital reference signal; and a processor that includes instructions for processing the digital reference signal with an adaptive filter, wherein the adaptive filter uses the digital reference and primary signals as inputs for determining filter weights of the adaptive filter to provide an output; and subtracting the output of the adaptive filter from the digital primary signal to generate a digital cancelled signal.

Also provided herein is a full-duplex wireless communication system that includes a receiver front end, an antenna, or a receiver input port capable of receiving an analog primary signal; a transmitter capable of transmitting an analog transmitted signal, wherein the transmitter is co-located with the receiver front end, the antenna, or the receiver input port; a directional coupler capable of sampling a portion of the analog transmitted signal to provide an analog reference signal; a first high-speed analog to digital converter capable of converting the analog primary signal into a digital primary signal; a second high-speed analog to digital converter capable of converting the analog reference signal into a digital reference signal; and a processor that includes instructions for: processing the digital reference signal with a single-loop adaptive filter, wherein the adaptive filter uses the digital reference and primary signals as inputs for determining filter weights of the adaptive filter to provide an output; and subtracting the output of the adaptive filter from the digital primary signal to generate a digital cancelled signal, wherein the digital cancelled signal is not further processed with a hardware filter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques provide methods and systems for full-duplex RF communication that are bandwidth-efficient and that maintain high throughput. The present techniques may be used in conjunction with the simultaneous operation of a transmitter and receiver on the same frequency from common or co-sited antennas. As provided, the techniques provide the advantage of full-duplex radio frequency communication without frequency-, time-, or code-division multiplexing and without the use of hardware RF cancellers. Such techniques may be useful for wireless communication, such a cellular communication, radio communication, broadcasting, short-range point-to-point communication, wireless sensor networks, and wireless computer networks. Such techniques may also be applied to wire or cable-based communication, including telecommunications, computer networking, powerline carrier systems, twisted pair or coaxial cable communication, or DSL communication.

Signal interference between transmitted and received signals on co-sited or coupled antennas may result in a received signal including an interference component that is representative of the transmitted signal. During normal operation, the receiver input port will contain two signal components: a strong transmitted signal, and a significantly weaker received signal. Simple subtraction of the transmitted signal at the receiver end is insufficient to eliminate this interference, because the version of the transmitted signal that is received has usually undergone some distortion. The received copy of the transmitted signal may be "corrupted" by the following effects: multipath reflected images of the original signal, phase distortion and amplitude changes, and delay. Accordingly, a simple subtraction may not account for the type and magnitude of the changes in the transmitted signal interference component of the received signal.

The present techniques provide a software-based adaptive filter to time- and phase-align the "clean" transmitted signal sampled at a transmitter input port to a "corrupted" version present at the receiver input port. Unlike previous approaches, the present techniques may be implemented using high-speed analog-to-digital (A/D) converters and software-controlled digital signal processors. By using two 14-bit converters and a single loop adaptive filter algorithm, narrowband incoming signals that are 100 dB (or lower) below the level of the transmitted signal may be decoded. While previous techniques have relied upon hardware RF cancellers, the present software-based techniques may provide more robust RF cancellation.

Figure 1:
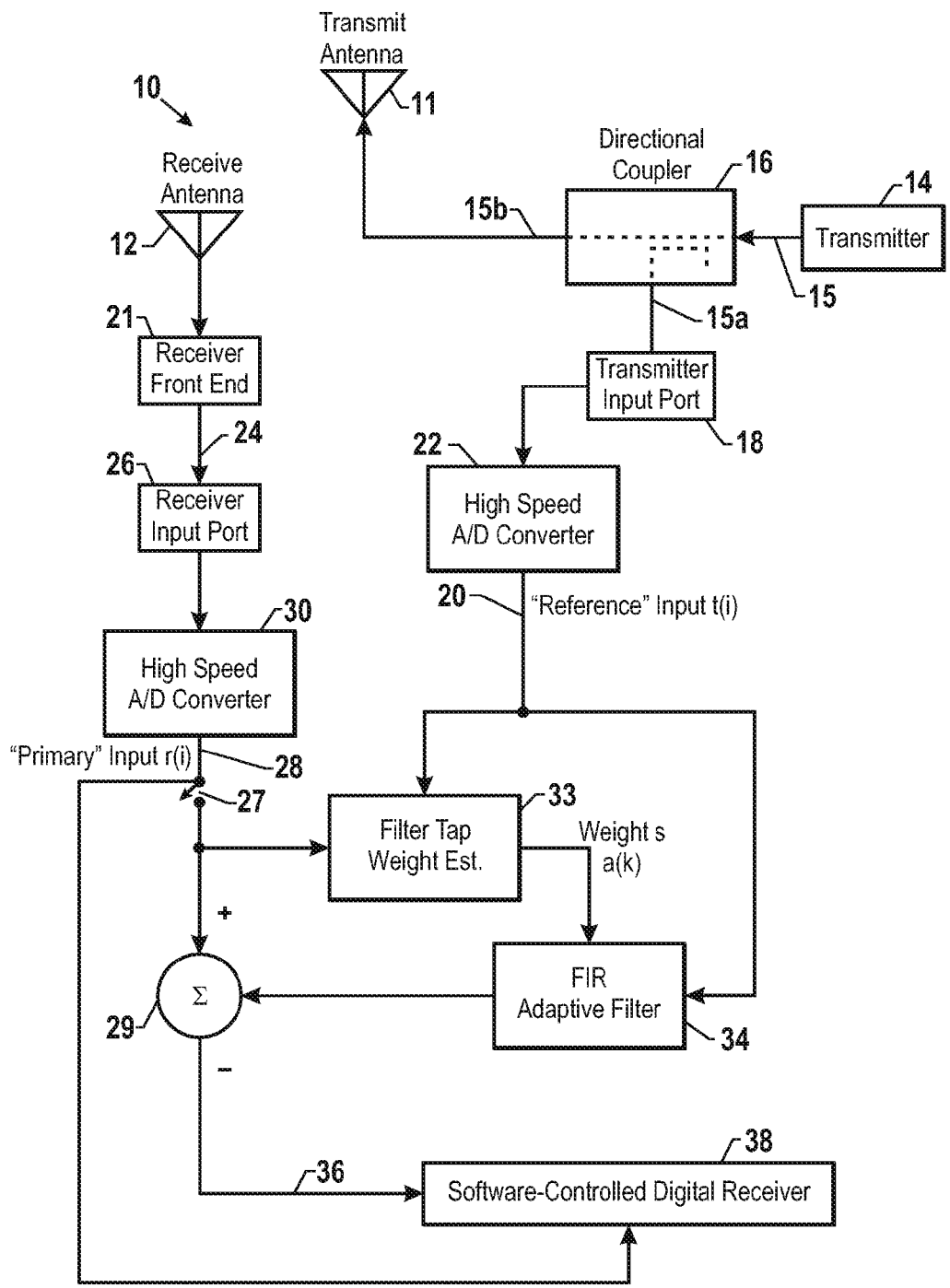
FIG. 1 is an exemplary wireless communication system including a digital adaptive filter.

Referring to FIG. 1, an exemplary full-duplex RF communications system 10 is depicted that includes a transmit antenna 11 and a receive antenna 12. In the transmitter portion of the system, a portion of the signal 15 from a transmit source (transmitter 14) is input to a directional coupler 16 to produce an attenuated signal 15a representative of the transmitted signal while the bulk of the signal 15b is input to a transmit antenna 11 and radiated as RF energy. The attenuated signal 15a is input to a transmitter input port 18 and is converted to a digital signal 20 by an A/D converter 22.

In the receiver portion of the system, a radiated RF signal is picked up by a receive antenna 12 and passed through a receiver front end 21 to produce a received signal 24. In embodiments that involve cable or wire-based communication, a cable signal may be directly passed to the receiver front end 21 without being picked up by antenna 12. The receiver front end 21 may consist of analog amplifiers and/or filters, such as a wideband buffer amplifier. The received signal 24 is input to a receiver input port 26, which in an embodiment may include hardware components such as an input jack, and is converted to a digital signal 28 by an A/D converter 30. In embodiments, the received signal 24 and the attenuated signal 15a may be converted to digital signals by a single A/D converter, e.g., a high-speed 14-bit converter, or by multiple A/D converters. The resulting digital received signal 28, also known as the primary input signal, is then input to a summer 29 and adaptive filter tap weight estimator 33. The digital attenuated signal 20, also known as the reference signal, is also input to estimator 33 and the digital adaptive filter 34. Tap weight estimator 33 periodically provides tap weight values to digital filter 34. Digital filter 34 provides an estimate of the transmitted signal that may be subtracted from the received signal with summer 29 to provide a cancelled signal 36. The resulting cancelled signal 36 may then be input to a software-controlled digital receiver 38 and may be further processed in any suitable manner. In an embodiment, the system 10 may include a bypass switch 27 for passing signal 24 directly to the receiver 38 without being processed by digital adaptive filter 34. For example, such an embodiment may be implemented if the signal 24 is degraded or corrupted to such an extent that digital cancellation may not be effective.

The digital adaptive filter 34 and summer 29 are a software-controlled and may include a backward adaptive filter tap estimator or a block forward tap estimator, in embodiments. In one embodiment, the adaptive filter/summer difference equation is given by $$y(i) = r(i) - \sum_{k=0}^{M-1} a(k)t(i-k) \quad (1)$$

where y(i) are the output samples, r(i) are the receiver input port samples (also known as the primary input signal), t(i) are the transmitter input port samples (also known as the reference input signal), M is the length of the adaptive filter, and a(k) are the adaptive filter tap weights. The filter taps can be estimated by solution of the following matrix equation:

$$\begin{bmatrix} R_{tt}(0,0) & R_{tt}(0,1) & \ldots & R_{tt}(0,M-1) \\ R_{tt}(1,0) & R_{tt}(1,1) & \ldots & R_{tt}(1,M-1) \\ \ldots & \ldots & \ldots & \ldots \\ R_{tt}(M-1,0) & R_{tt}(1,M-1) & \ldots & R_{tt}(M-1,M-1) \end{bmatrix} \begin{bmatrix} a(0) \\ a(1) \\ \ldots \\ a(M-1) \end{bmatrix} = \quad (2)$$

$$\begin{bmatrix} R_{tr}(0) \\ R_{tr}(1) \\ \\ R_{tr}(M-1) \end{bmatrix}$$

where $$R_{tt}(j,k) = \sum_{i=M-1}^{N-1} t(i-j)t(i-k) \quad (3)$$

and $$R_{tr}(k) = \sum_{i=M-1}^{N-1} r(i)t(i-k) \quad (4)$$

and N is the length of the block of transmitter input port/receiver input port samples over which to estimate the filter taps.

Figure 2:
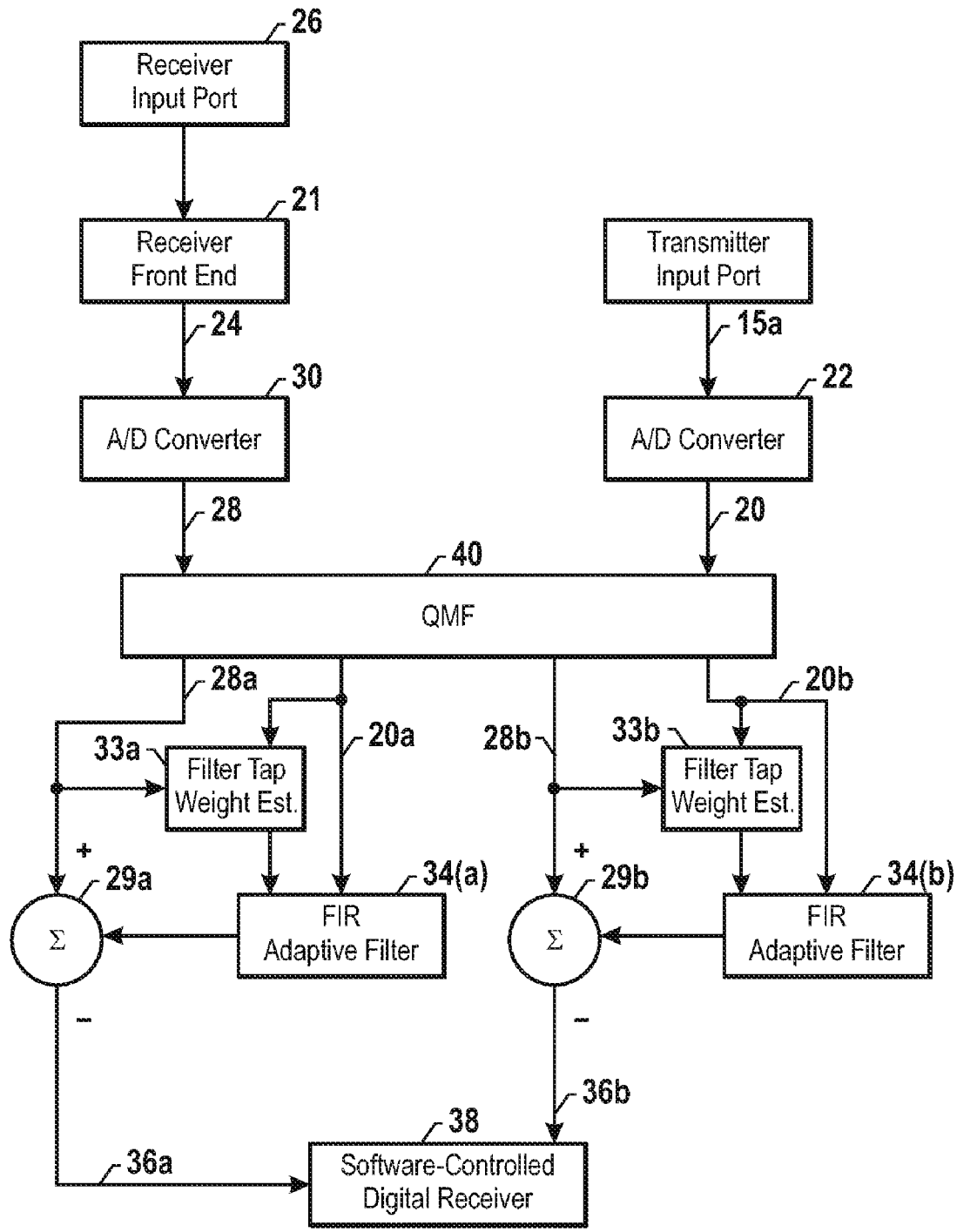
FIG. 2 shows an exemplary band separation system used in conjunction with digital adaptive filters.

Turning to FIG. 2, in some embodiments, the received signal spectrum may be divided prior to digital processing. For example, in embodiments, the entire wideband sampled spectrum may be divided into multiple bands, and a separate cancellation solution (e.g. adaptive filter processing) may be performed on each band. In embodiments, the signal spectrum may be separated into any number of bands. FIG. 2 shows an exemplary processing method in which the signal is divided into two separate bands prior to processing with adaptive filters. In the depicted embodiment, the received signal 24 from the receiver front end 21 and/or receiver input port 26 is converted to a digital signal 28 by A/D converter 30. Similarly, attenuated transmit signal 15a from the transmitter input port 18 is converted to a digital signal 20 by A/D converter 22.

In embodiments, an efficient Quadrature Mirror Filter (QMF) structure 40 may be employed to perform the band separation of digital signals 28 and 20. Separated signals 28a and 20a that reflect corresponding bands may be processed together in adaptive filter 34a with tap weight estimator 33a to form a cancellation solution for a particular band. Separated signals 28b and 20b may likewise be processed together with adaptive filter 34b and tap weight estimator 33b. The resulting estimate of the transmitted signal provided by the adaptive filters 34a and 34b may be subtracted from the received signal by summers 29a and 29b, respectively. The resulting two cancellation solutions, 36a and 36b may be recombined by the software-controlled digital receiver 38.

Figure 3:
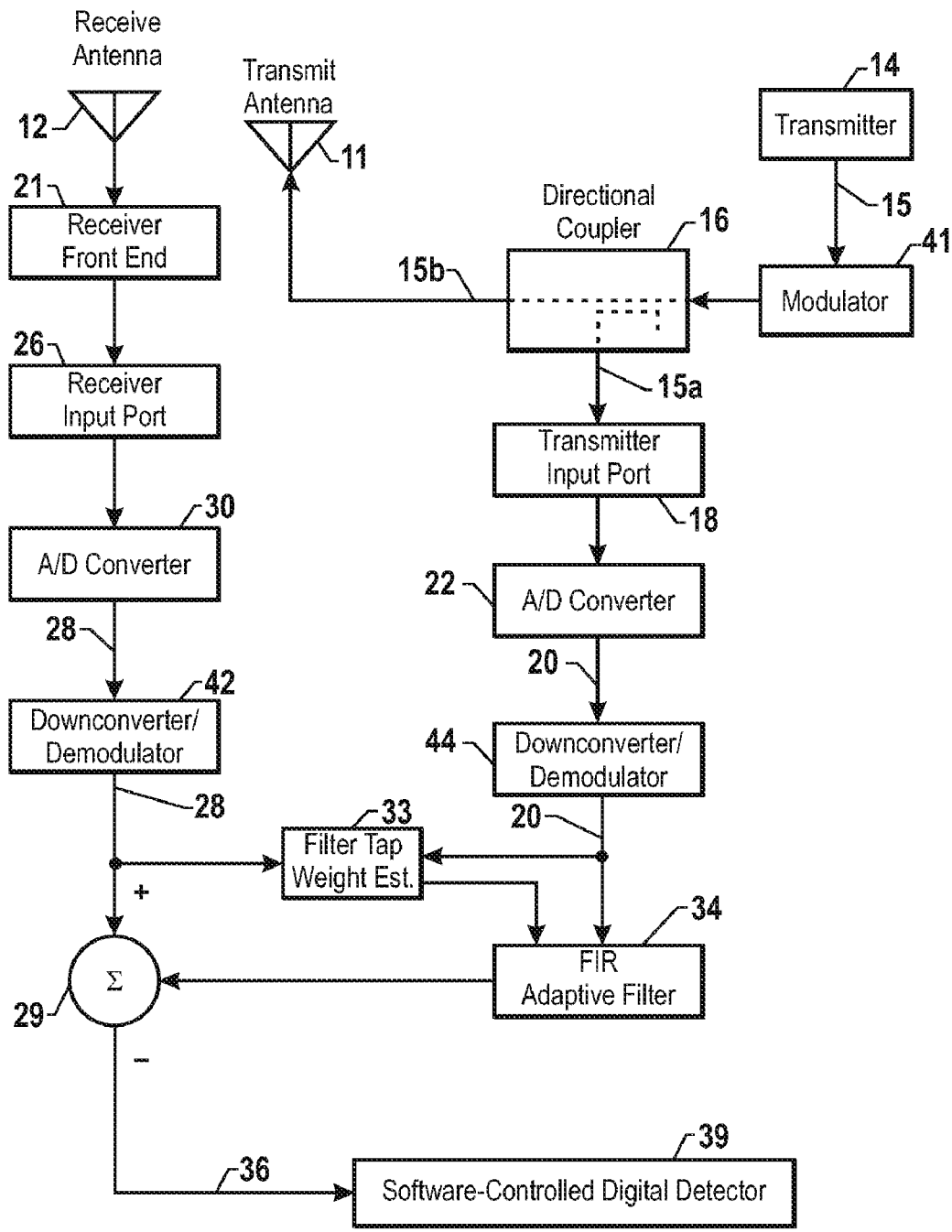
FIG. 3 is an alternative wireless communication system including a digital adaptive filter.

In alternative embodiments, a system 10 may include a wireless communication architecture in which the digital adaptive filter 34 is placed at the end of the software radio chain, either on the I/Q baseband signals or after the demodulation algorithm, as shown in FIG. 3. The depicted communications system 10 includes a transmit antenna 11 and a receive antenna 12. In the transmitter portion of the system, the signal 15 from transmitter 14 may be modulated by modulator 41 and input to a directional coupler 16 to produce an attenuated signal 15a representative of the transmitted signal while the bulk of the signal 15b is input to a transmit antenna 11 and radiated as RF energy. The attenuated signal 15a is input to a transmitter input port 18 and is converted to a digital signal 20 by A/D converter 22.

Receive antenna 12 produces a received signal 24 that is input to a receiver front end 21 and/or receiver input port 26 and is converted to a digital signal 28 by A/D converter 30. In embodiments, if the demodulation is coherent, then two independent carrier recovery algorithms may be used for separately downconverted transmitter input port and receiver input port, "I" and "Q," signals, respectively. In other embodiments the cancellation can occur after downconversion on the I and Q signals (but before demodulation), or that cancellation can occur after downconversion and demodulation. Digital signal 28 may be input to downconverter/demodulator 42 prior to being input to a summer 29 and tap weight estimator 33. The digital attenuated signal 20, may be input to downconverter/demodulator 44 prior to being input to the digital adaptive filter 34 and tap weight estimator 33. The resulting cancelled signal 36 may be passed to a digital detector 39 In such embodiments, the adaptive filter 34 may operate at a relatively lower sampling rate (e.g., a 5000:1 decimation factor for some narrowband applications) as compared to architectures in which the transmitted and received signals undergo RF cancellation relatively early in the software radio chain.

In one embodiment, the system 10 may be adapted to freeze the filter tap solution to a previous solution in instances where the received signal quality is strong enough that the signal introduces bias into the system. For example, in embodiments where the received signal is of sufficient power levels that the signal at the transmitter input port may be corrupted with a component of the received signal, the adaptive filter may not correctly determine the filter weights using a sample of the corrupted transmitted signal.

Figure 4:
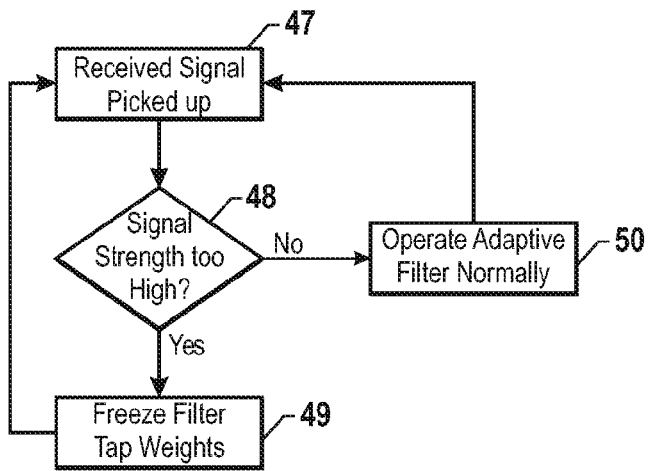
FIG. 4 is an exemplary flow chart

FIG. 4 is an exemplary flow chart 46 for implementing a filter tap weight freeze in certain embodiments. In step 47, a received signal 24 is picked up, either from wireless or wire-based sources. Control passes to step 48, whereby the received signal is evaluated for signal strength. In embodiments, the received signal 24 strength may be evaluated at times when the transmitter 14 is not transmitting. Normally, the received signal present at port 26 is significantly weaker than a transmitted signal present at port 18. However, if the received signal present at port 26 is particularly strong, for example, if the ratio of the received signal/transmitted signal is larger than a predetermined value or range or if the received signal is compared to a control signal, control may pass to step 49, which alters the execution of the adaptive filter. In step 49, an external control processor may freeze the most recent filter tap weights, i.e., may use weights from a solution taken from a time point in which the primary signal was determined to be at a level less likely or unlikely to introduce bias. Such a solution from that time point, as a result, may be free of bias from a strong received signal present at port 26. In such an embodiment, the adaptive filter may freeze updating the tap weights of the filter. In embodiments, a system 10 may shut off incoming transmissions to antenna 12 until such a time as the incoming signal has decreased in strength to a point where bias is less likely. Accordingly, the flow chart 46 may proceed back to step 47 to evaluate the received signal until the received signal present at port 26 is weaker and less likely to introduce bias. At such a point, the adaptive filter may resume normal operation at step 50 and recalculate the filter tap weights based on the incoming primary and reference signals. In embodiments, the system 10 may also receive incoming signals from remote transmitters when the signal strength has decreased to below the control level.

An exemplary adaptive filter 34 was evaluated during a software simulation. The following conditions were in effect:
    RF simulation: 64 bit double precision floating point, 100 MHz sampling rate
    A/D rate=100 MHz
    A/D depth=14 bits
    A/D model=clean (no harmonic spurs with single tone)
    Transmit signal amplitude=+78.6 dB (ref A/D 1 unit)
    Receive signal amplitude=−20 dB (ref A/D 1 unit)
    T/R ratio=98.6 dB
    Transmitter impairments:
        Delay from TIP to RIP=40 nsec
        Fractional sample phase shift=0.33 samples
        8 tap multipath model
        $2^{nd}$ and $3^{rd}$ order distortion products (non-aliased)
    Transmitted signal type: GMSK, BT=1.0, 100 kb/sec
    Received signal type: GMSK, BT=1.0, 100 kb/sec
    Carrier frequency=10 MHz
    T/R offsets=0, 1, 10 Hz
    Adaptive filter size: 5 to 32 taps
    SDR receiver downconverter information:
        20 bit NCO sin/cos table with $1^{st}$ order Taylor series correction
        $3^{rd}$ order CIC, 100:1 decimation
        Dual FIR final stage filter, 32 and 64 taps, 2:1 decimation
        5 samples/symbol output rate
    GMSK detection: non-coherent discriminator A simulation using a run of 10,000 symbols was conducted. No bit errors were observed using a transmit signal to receive signal ratio of 98.6 dB.

Figure 5:
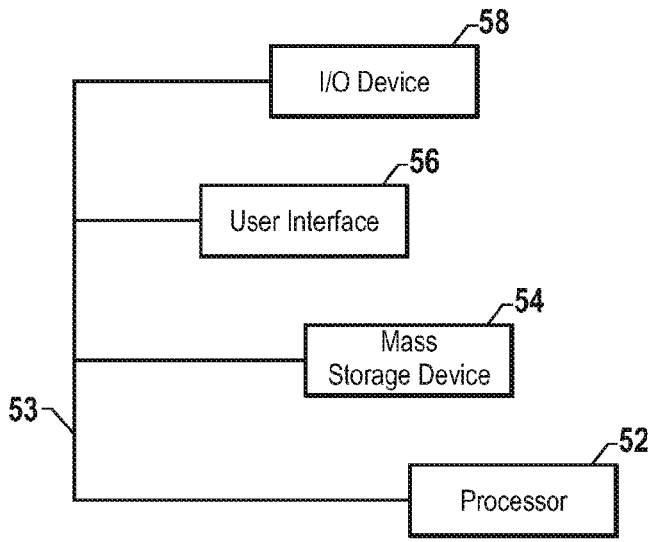
FIG. 5 is an exemplary hardware implementation of the present techniques.

FIG. 5 illustrates one embodiment of a hardware system intended to represent a broad category of computer systems such as personal computers, workstations, and/or embedded systems that may be used in conjunction with the present techniques. In embodiments, it is envisioned that the system 10 may include an external control that may include certain hardware and software components for implementing the present techniques, including control of the individual components of system 10. In the illustrated embodiment, the hardware system includes processor 52 and mass storage device 54 coupled to high speed bus 53. A user interface device 56 may also be coupled to the bus 53. User interface devices may include a display device, a keyboard, one or more external network interfaces, etc. An input/output device 58 may also be coupled to the bus 53. In an embodiment, the user interface, for example the display, may communicate certain information related to the status of the operation of the adaptive filter. For example, the display may display information relating to the quality of the adaptive filter cancellation. In embodiments in which the quality is compromised, an operator may choose to bypass the adaptive filter 34 and proceed directly to the software-controlled receiver 38 with bypass switch 27.

Certain embodiments may include additional components, may not require all of the above components, or may combine one or more components. For instance, mass storage device 54 may be on-chip with processor 52. Additionally, the mass storage device 54 may include an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Additional components may include additional processors, a CD ROM drive, additional memories, and other peripheral components.

In one embodiment, the present techniques may be implemented using one or more computers such as the hardware system of FIG. 5. Where more than one computer is used, the systems can be coupled to communicate over an external network, such as a local area network (LAN), an internet protocol (IP) network, etc. In one embodiment, the techniques may be implemented as software routines executed by one or more execution units within the computer(s). For a given computer, the software routines can be stored on a storage device, such as mass storage device 54.

Figure 6:
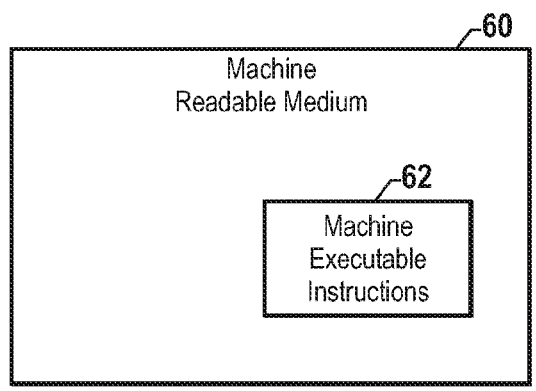
FIG. 6 is an exemplary software implementation of the present techniques.

As shown in FIG. 6, the software routines can be machine executable instructions 60 stored using any machine readable storage medium 62, such as a diskette, CD-ROM, magnetic tape, digital video or versatile disk (DVD), laser disk, ROM, Flash memory, etc. The series of instructions may be received from a remote storage device, such as a server on a network, a CD ROM device, a floppy disk, etc., through, for instance, I/O device(s) 58 of FIG. 5. From whatever source, the instructions may be copied from the storage device into memory 54 and then accessed and executed by processor 52. In embodiments, it is envisioned that the software routines may be installed as an update package for an existing wireless communication systems.

In embodiments, a communication system 10 may be part of a network that may include multiple nodes, each node including a system 10. The nodes may be interconnected with any suitable connection architecture and may be controlled, in embodiments, from a central station. For example, a network may include a cellular communication network. In such embodiments, each node or a subset of the nodes in the network may employ the digital adaptive filtering technique as provided.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   receiving an unprocessed wideband analog primary signal from a receiver front end, an antenna, or a receiver input port;
   receiving an unprocessed wideband analog reference signal from a transmitter;
   converting the unprocessed wideband analog primary signal directly into a digital primary signal;
   converting the unprocessed wideband analog reference signal directly into a digital reference signal; and
   processing the digital reference signal with a digital adaptive filter, wherein the digital adaptive filter uses the digital reference and primary signals as inputs to a block forward estimator for determining filter weights of the digital adaptive filter to provide an output; and
   subtracting the output of the digital adaptive filter from the digital primary signal to generate a digital cancelled signal.

2. The method of claim 1, comprising separating one or both of the digital primary signal or the digital reference signal into one or more bandwidths prior to processing the digital primary signal with an adaptive filter.

3. The method of claim 1, wherein directly converting the unprocessed analog primary signal into a digital primary signal comprises using a high speed analog to digital converter and wherein directly converting the unprocessed analog reference signal into a digital reference signal comprises using a high speed analog to digital converter.

4. The method of claim 1, comprising determining a signal strength of a received signal component of the analog primary signal and, if the signal strength is greater than a control signal, using filter weights of the digital adaptive filter determined at a time point when the signal strength was less than the control signal.

5. The method of claim 4, wherein the control signal comprises a threshold or a ratio.

6. The method of claim 4, comprising freezing filter weight updates of the digital adaptive filter until the signal strength is less than the control signal.

7. A device, comprising:
   a first analog to digital converter configured to convert an unprocessed analog primary signal from a receiver front end directly into a digital primary signal;
   a second analog to digital converter configured to convert an unprocessed analog reference signal from a transmitter directly into a digital reference signal; and
   a processor programmed with instructions configured to:
      process the digital reference signal with a digital adapter filter, wherein the digital adaptive filter uses only the digital reference and primary signals without a feedback loop as inputs for determining filter weights of the digital adaptive filter to provide an output; and
      subtract the output of the digital adaptive filter from the digital primary signal to generate a digital cancelled signal.

8. The device of claim 7, wherein the adaptive filter comprises a single-loop adaptive filter.

9. The device of claim 7, wherein the adaptive filter size is in the range of 5 to 32 taps.

10. The device of claim 7, wherein the adaptive filter comprises the following equation:

$$y(i) = r(i) - \sum_{k=0}^{M-1} a(k)t(i-k)$$

were y(i) are the output samples, r(i) are the receiver input port samples, t(i) are the transmitter input port samples, M is the length of the adaptive filter, and a(k) are the adaptive filter tap weights.

11. The device of claim 7, comprising instructions for separating one or both of the digital primary signal or the digital reference signal into one or more bandwidths prior to processing the digital reference signal with an adaptive filter.

12. The device of claim 7, wherein converting the unprocessed analog reference signal into a digital reference signal comprises using a high speed analog to digital converter.

13. The device of claim 7, wherein the machine-readable instructions comprise an upgrade package.

14. A full-duplex wireless communication system comprising:
  a receiver front end, an antenna, or a receiver input port capable of receiving an unprocessed analog primary signal;
  a transmitter capable of transmitting an analog transmitted signal;
  a directional coupler capable of sampling a portion of the analog transmitted signal to provide an unprocessed analog reference signal;
  a first analog to digital converter capable of directly converting the unprocesssed analog primary signal into a digital primary signal;
  a second analog to digital converter capable of directly converting the unprocessed analog reference signal into a digital reference signal; and
  a processor comprising instructions for:
    processing the digital reference signal with an adaptive filter, wherein the adaptive filter uses only the digital reference and primary signals without a feedback loop as inputs for determining filter weights of the adaptive filter to provide an output; and
    subtracting the output of the adaptive filter from the digital primary signal to generate a digital cancelled signal.

15. The system of claim 14, wherein the adaptive filter size is in the range of 5 to 32 taps.

16. The system of claim 14, wherein the processor comprises instructions for separating one or both of the digital primary signal or the digital reference signal into one or more bandwidths prior to processing the digital reference signal with an adaptive filter.

17. The system of claim 14, wherein one or both of the first analog to digital converter or the second analog to digital converter comprises a high speed analog to digital converter.

18. The system of claim 14, wherein the system does not comprises a hardware canceller capable of processing the analog primary signal.

19. The system of claim 14, wherein the system comprises a cellular communication system.

20. The system of claim 14, wherein the system comprises a cable or wire-based communication system.

21. The system of claim 14, wherein the system is part of a network, comprising a plurality of the full-duplex wireless communications systems.

22. The system of claim 14, comprising a bypass switch capable of bypassing the digital adaptive filter and passing the digital primary signal directly to a receiver.

23. A full-duplex wireless communication system comprising:
  a receiver front end, an antenna, or a receiver input port capable of receiving an unprocessed analog primary signal;
  a transmitter capable of transmitting an analog transmitted signal, wherein the transmitter is co-located with the receiver front end, the antenna, or the receiver input port;
  a directional coupler capable of sampling a portion of the analog transmitted signal to provide an unprocessed analog reference signal;
  a first high-speed analog to digital converter capable of converting the unprocessed analog primary signal directly into a digital primary signal;
  a second high-speed analog to digital converter capable of converting the unprocessed analog reference signal directly into a digital reference signal; and
  a processor comprising instructions for:
    processing the digital reference signal with a single-loop adaptive filter, wherein the adaptive filter uses only the digital reference and primary signals without a feedback loop as inputs for determining filter weights of the adaptive filter to provide an output; and
    subtracting the output of the adaptive filter from the digital primary signal to generate a digital cancelled signal, wherein the digital cancelled signal is not further processed with a hardware filter.

* * * * *

UNITED STATES PATENT AND TRADEMARK OFFICE
CERTIFICATE OF CORRECTION

PATENT NO. : 8,199,681 B2
APPLICATION NO. : 12/334019
DATED : June 12, 2012
INVENTOR(S) : Zinser et al.

It is certified that error appears in the above-identified patent and that said Letters Patent is hereby corrected as shown below:

In the Specification

In column 4, lines 34-44, equation (2) should read:

$$\begin{bmatrix} R_{tt}(0,0) & R_{tt}(0,1) & \cdots & R_{tt}(0,M-1) \\ R_{tt}(1,0) & R_{tt}(1,1) & \cdots & R_{tt}(1,M-1) \\ \cdots & \cdots & \cdots & \cdots \\ R_{tt}(M-1,0) & R_{tt}(M-1,1) & \cdots & R_{tt}(M-1,M-1) \end{bmatrix} \begin{bmatrix} a(0) \\ a(1) \\ \cdots \\ a(M-1) \end{bmatrix} = \begin{bmatrix} R_{tr}(0) \\ R_{tr}(0) \\ \cdots \\ R_{tr}(M-1) \end{bmatrix}$$

Signed and Sealed this
Twenty-eighth Day of January, 2014

Michelle K. Lee
*Deputy Director of the United States Patent and Trademark Office*